C. H. DEERING.
CORN HUSKING MACHINE.
APPLICATION FILED AUG. 11, 1913.
1,096,416.
Patented May 12, 1914.
3 SHEETS—SHEET 2.
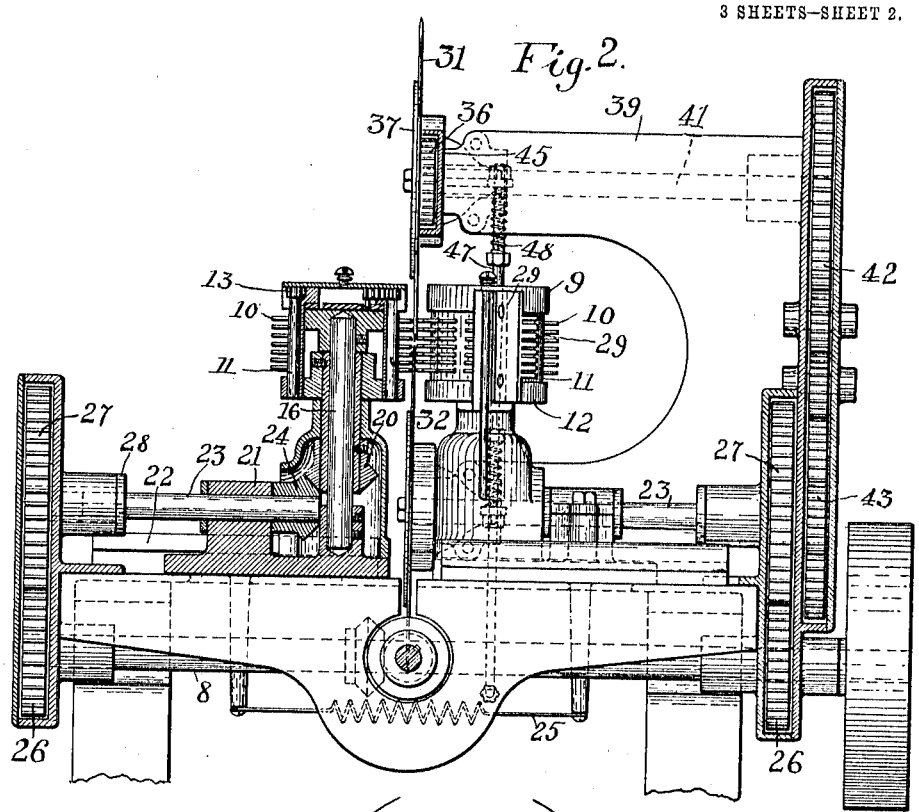
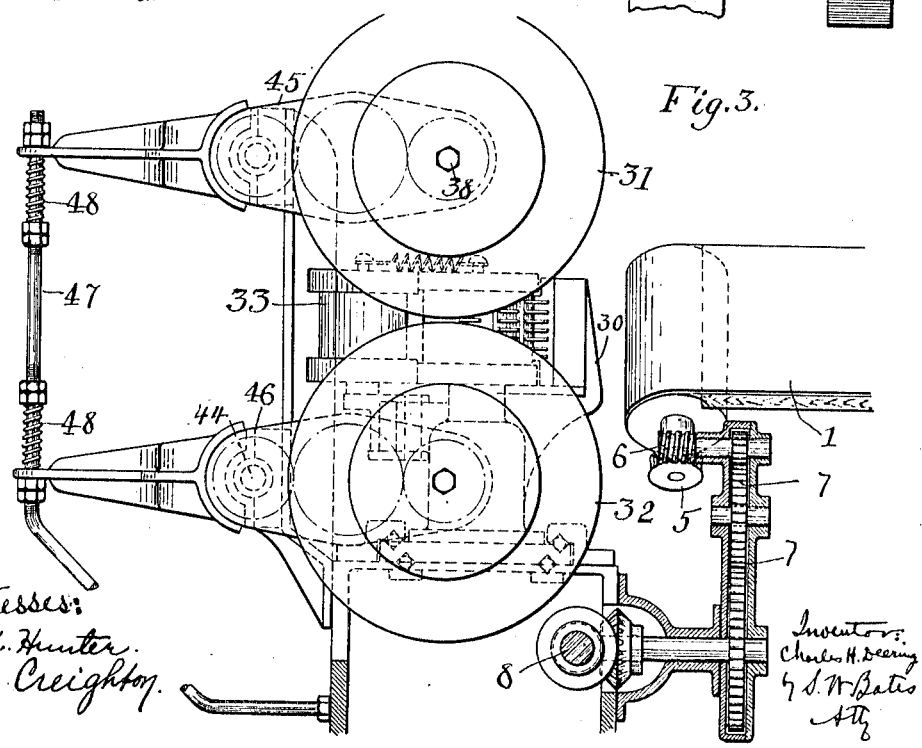

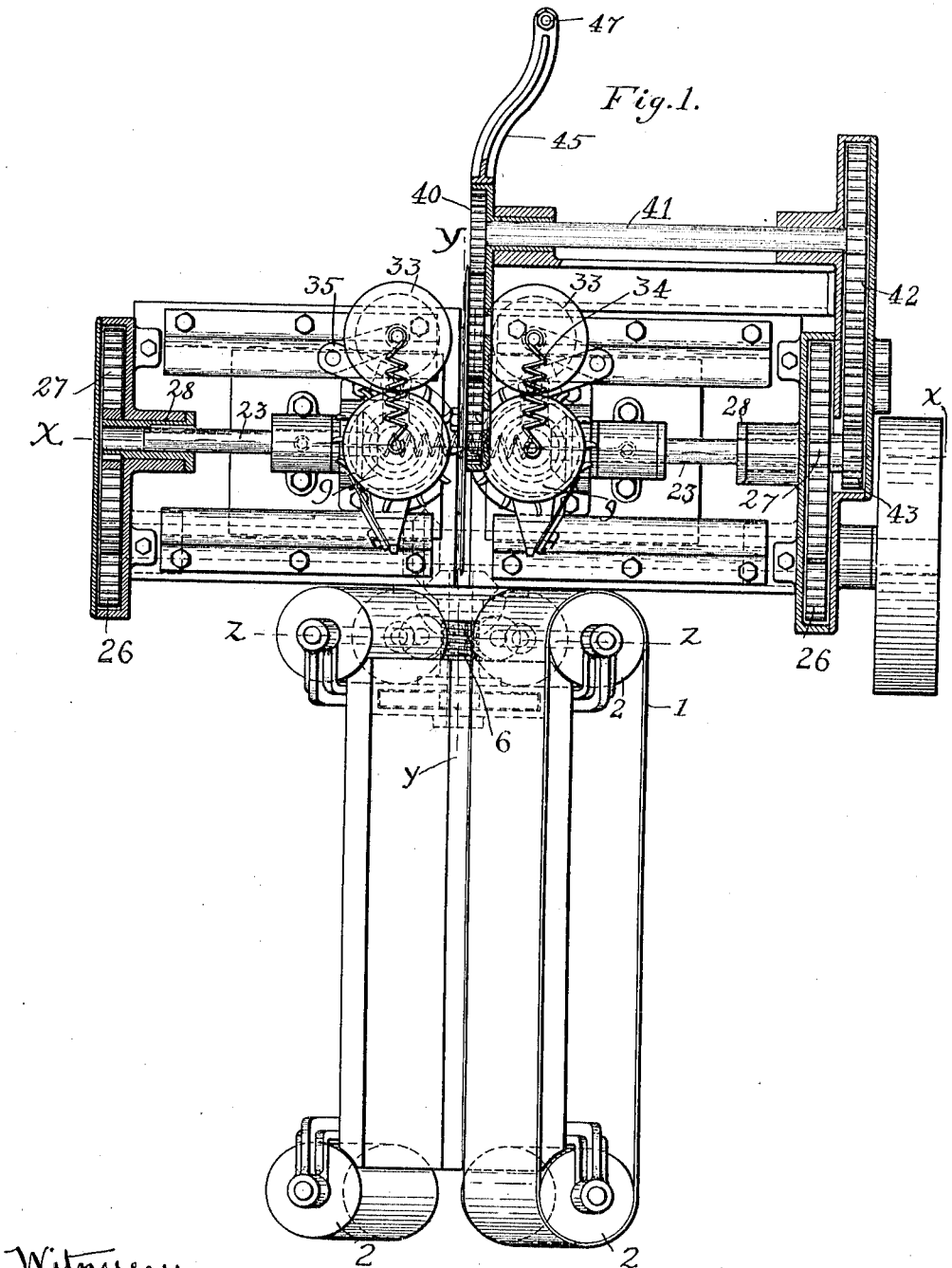

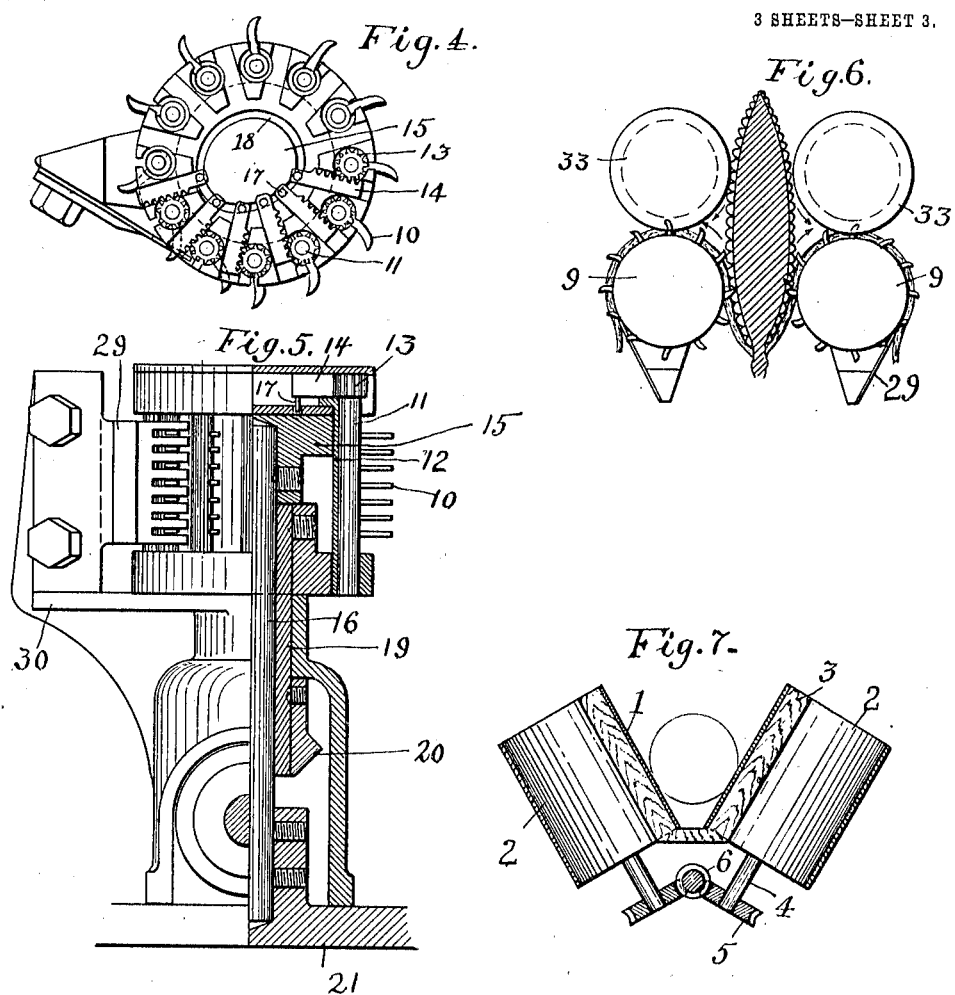

UNITED STATES PATENT OFFICE.

CHARLES H. DEERING, OF PORTLAND, MAINE.

CORN-HUSKING MACHINE.

1,096,416.   Specification of Letters Patent.   Patented May 12, 1914.

Application filed August 11, 1913. Serial No. 784,081.

*To all whom it may concern:*

Be it known that I, CHARLES H. DEERING, of Portland, in the county of Cumberland and State of Maine, have invented certain new and useful Improvements in Corn-Husking Machines, of which the following is a specification.

My invention relates to machines for husking green corn of that class wherein the ears are passed one at a time longitudinally between a pair of husking rolls having peripheral barbs or spurs which entangle the husks and strip them from the ear, the husk having been first cut longitudinally into two halves by suitable cutters. In these machines the barbs are rigidly secured to the roll and after they pierce the husks and tear them from the ear they are themselves disentangled from the husks by strippers between which the barbs pass and by which the husks are torn from their engagement with the barbs. Thus as the husking rolls revolve, the barbs are continually entangling themselves with the husks and tearing themselves free from the husks, a process which requires much power and which is liable to mutilate the kernels of corn.

According to my invention I make the barbs or spurs in the form of hooks which are made movable with respect to the roll so that when they have engaged the husks and torn them from the ears they are withdrawn from the husks in such a way as not to tear the husks. These latter are quickly and easily freed by the strippers since the hooks are backed out from the husks in the same path in which they entered. The husks are thus easily and quickly stripped from the ears with the expenditure of very little power and with little danger of mutilating the kernels of corn.

My invention may best be understood by reference to the accompanying drawing, in which—

Figure 1 is a plan of a corn husking machine embodying my invention. Fig. 2 is a section on the line $x$ $x$ of Fig. 1. Fig. 3 is a section on the line $y$ $y$ of Fig. 1. Fig. 4 is a plan of one of the husking rolls with the top and certain other parts removed. Fig. 5 is a half elevation and half section of the husking roll and adjacent parts. Fig. 6 is a diagrammatic section showing the operation of the husking roll, and Fig. 7 is a cross section on the line $z$ $z$ of Fig. 1.

The ears of corn are fed to the husking rolls in any suitable manner according to the practice in machines of this character.

As here shown, I employ a pair of feeding belts 1, 1 which run over rolls 2 2. These rolls are set at an angle with each other and the advancing portion of each belt rests on one side of an angular trough 3 in which the ears are placed one at a time and fed to the machine preferably point first. Each roll 2 has a shaft 4 carrying a worm gear 5 which engages a worm 6 actuated by a train of gears 7 connecting with the main shaft 8 of the machine.

The ears are delivered one at a time from the belts to a pair of husking rolls. These rolls are preferably disposed with a vertical axis and each roll is provided with a series of peripheral hooks which have a motion with respect to the roll whereby they withdraw themselves from engagement with the husks by backing out by the same path in which they entered, thus avoiding any tearing of the husks.

As here shown, a pair of husking rolls 9 are provided with husk removing hooks 10 and the hooks 10 are carried by a series of shafts 11 which are journaled in the walls of the cylindrical shell 12, the shafts being parallel with the axis of the roll.

The outer portion of the shell is cut away except for a short distance at the top and bottom so that the shafts project beyond the surface of the shell. Each shaft thus has a journal bearing at the top and bottom of the shell while the center is only supported at its inner side. The hooks 10 each have a pointed and slightly hook-shaped end so that as the roll revolves the end of the hook easily enters the husk, taking a firm hold.

At the proper point in the rotation of the roll the shafts are made to rotate in such a manner as to cause the hooks to back out and release the husks and allowing the stripper to clear the husks from the roll. For the purpose of rotating the shaft I provide a series of radially disposed racks 14 in the top of the shell, these racks engaging gears 13 on the upper ends of the shafts. The racks slide in recesses cut in the top of the shell and they have a limited motion from and toward the center of the roll.

The inward and outward motion of the racks is produced by a path cam 15 secured to the upper end of the stud 16 which forms the pivotal center on which the roll turns. Pins 17 on the inner ends of the racks travel in the path 18 of the cam and the path 18 is so formed as to hold the hooks at their outer position until they are on the back side of the roll and opposite to the point where they engage the husks. When they reach this point each shaft is in turn rotated to back the hook out of its engagement with the husk and swing it in toward the roll.

A hollow shaft 19 on the upper end of which the shell is secured is journaled on the stud 16 and turns thereon and on the lower end of the shaft 19 is a bevel gear 20. Each of the husking rolls is mounted in a laterally slidable carriage 21 which slides in suitable grooves 22 in the bed of the machine and in each of the carriages is journaled a horizontal shaft 23 carrying a bevel gear 24 which engages the gear 20 by which the rolls are driven. Strippers 29 are secured to an upright bracket 30 carried by the carriage 21. The strippers consist of a series of fingers set at an inclination to the back surface of the roll and spaced so that the hooks 10 pass between them. They aid in freeing the hooks from engagement with the husks.

Means are provided for guiding the husks away from the ears of corn after they have started from the ear. For this purpose I provide a pair of pressure rolls 33 immediately in the rear of the husking rolls 9 and pressed into contact with them by springs 34. The rolls 33 are journaled on jointed swinging arms 35 so that they are free to be drawn into close contact with the rolls 9. The top and bottom portions of both the rolls 9 and the rolls 33 project beyond the central portion, leaving an intervening space through which the hooks pass. The friction between the two sets of rolls keeps the pressure rolls revolving and the husks are guided away from the ear of corn to a position on the back side of the rolls where they are dropped and freed from the hooks.

The two carriages 21 are yieldingly drawn together by a spring 25 by which they are connected and they are separated by the pressure of the ears of corn as the latter are fed through the rolls.

Power is transmitted to the working parts of the machine by means of the main driving shaft 8 which has at each end a gear 26. Each of the gears 26 engages a gear 27 one at each side of the machine. Each gear 27 has a sleeve 28 splined to one of the shafts 23. Thus the carriages are at liberty to move to a limited extent toward and away from the center while receiving power from the gears 27 and sleeves 28. Means are provided for slitting the husks on the upper and under sides so that they may be parted by the hooks and removed in two sections. For this purpose I provide a pair of slitting disks 31 and 32 one above and one below.

The disk 31 is secured between a gear 36 in the rear and a plate 37 in front, these parts being secured to a short shaft 38 on the end of a bracket 39 which is carried by the frame of the machine. The disk takes its power from a train of gears 40, one of which is on the end of the shaft 41, and the gears 40 are inclosed in a casing 45 which is pivoted by the shaft 41 so that the disk may have a limited vertical motion. A train of gears 42 transmit power to the shaft 41 from the gear 43 on a sleeve with one of the gears 27.

The lower disk 32 gets its power in a similar manner from a shaft 44 vertically below the shaft 41 and through a train of gears inclosed in a casing 46 pivoted by the shaft 44. The rear arms of the casings 45 and 46, which casings in effect constitute levers, are united by a rod 47 which passes through holes in the rear ends of the arms. This rod is provided with spiral springs 48 which press against the arms and tend to resist any tendency of the disks to separate, providing a yielding pressure by which they are pressed against the ear to slit the husk. The tension on the disks may be regulated by changing the tension on the springs 48 in the well known manner.

From what has been said the operation of my husking machine will now be clearly understood.

The ears are fed to the husking rolls through the trough 3 and the husks are slit by the slitting disks into two halves. The hooks 10 seize the husks on each side of the ear and carry each half in one mass or body between the husking rolls and the pressure rolls to the back side of the husking rolls where the hooks withdraw from the husks and allow the strippers to easily free them from the rolls.

A husking machine constructed on this principle requires little power since the hooks do not have to tear themselves free of the husks.

Suitable provision is made for disposing of the ears after they are husked and the husks after they are removed from the ear.

The ears of corn are run through the machine without removing the butts and the pull on the husks strips them clear from the ears. The fact that so many of the hooks engage the husk at one time enables the rolls to exert a pull sufficient to break off the husks at the butt. It is thus unnecessary to remove the butts from the ears of corn before they are fed to the husking machine as is the case with many husking machines.

I claim:—

1. A husking machine of the character specified including a pair of stripping rolls between which the ears of corn pass, said rolls having peripheral hooks for engaging the husks and stripping them from the ear and positively operated means for changing the position of the hooks with respect to the roll for disengaging the husks.

2. A husking machine of the character specified including a pair of stripping rolls between which the ears of corn pass, said rolls having peripheral hooks for engaging the husks and stripping them from the ear and positively operating means for withdrawing said hooks toward the roll in the same path by which they enter the husk to disengage the same.

3. A husking machine of the character specified including a pair of stripping rolls between which the ears of corn pass, said rolls having pivoted peripheral hooks and means for imparting a rotary motion to said hooks to cause them to engage the husks and strip them from the ear and to disengage the same with a motion in the reverse direction.

4. A husking machine of the character specified including a pair of stripping rolls between which the ears of corn pass, shafts pivoted in said roll, husk engaging hooks secured to said shafts and means for imparting a rotary motion to said shafts to cause said hooks to engage the husks to strip them from the ears and to disengage the same with a motion in the reverse direction.

5. A husking machine of the character specified including a pair of stripping rolls between which the ears of corn pass, said rolls having pivoted peripheral hooks and means for imparting a rotary motion to said hooks in opposite directions to cause them to engage and disengage the husks.

6. A husking machine of the character specified including a pair of stripping rolls between which the ears of corn pass, shafts pivoted in said roll, husk engaging hooks secured to said shafts, gears on said shafts, racks engaging said gears and means actuated by the rotation of said roll for reciprocating said racks to impart a rotary motion to said hooks in opposite directions.

7. A husking machine of the character specified including a pair of stripping rolls between which the ears of corn pass, shafts pivoted in said roll, husk engaging hooks secured to said shafts, gears on said shafts, racks engaging said gears and a cam for reciprocating said racks to impart a rotary motion to said hooks in opposite directions.

8. A husking machine of the character specified including a pair of stripping rolls between which the ears of corn pass, shafts pivoted in said roll, husk engaging hooks secured to said shafts, gears on said shafts, racks engaging said gears, a stationary path cam and pins on the inner ends of said racks positioned to travel in the path of said cam to impart a rotary motion to the hooks in opposite directions.

9. A husking machine of the character specified including a pair of stripping rolls between which the ears of corn pass, said rolls being composed of a cylindrical shell, a series of shafts journaled in the walls of said shell and parallel with the axis thereof, outwardly projecting hooks carried by said shafts, gears on the ends of said shaft, radially disposed racks in said roll engaging said gears, a stationary path cam fitting the upper end of said shell, and pins on the inner ends of said racks positioned to travel in the path of said cam to impart a rotary motion to said hooks in opposite directions.

In testimony whereof I have affixed my signature, in presence of two witnesses.

CHARLES H. DEERING.

Witnesses:
S. W. BATES,
C. B. CREIGHTON.

---

Copies of this patent may be obtained for five cents each, by addressing the "Commissioner of Patents, Washington, D. C."